United States Patent
Moulon et al.

(10) Patent No.: US 10,737,795 B2
(45) Date of Patent: Aug. 11, 2020

(54) HYBRID PROPULSION SYSTEM FOR A MULTI-ENGINE AIRCRAFT

(71) Applicant: SAFRAN HELICOPTER ENGINES, Bordes (FR)

(72) Inventors: Frederic Moulon, Pau (FR); Fabien Mercier-Calvairac, Pau (FR); David Le Maux, Idron (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 542 days.

(21) Appl. No.: 15/519,878

(22) PCT Filed: Oct. 15, 2015

(86) PCT No.: PCT/FR2015/052770
§ 371 (c)(1),
(2) Date: Apr. 18, 2017

(87) PCT Pub. No.: WO2016/062945
PCT Pub. Date: Apr. 28, 2016

(65) Prior Publication Data
US 2017/0247114 A1 Aug. 31, 2017

(30) Foreign Application Priority Data
Oct. 20, 2014 (FR) ...................... 14 60058

(51) Int. Cl.
*B64D 27/02* (2006.01)
*B64D 27/12* (2006.01)
(Continued)

(52) U.S. Cl.
CPC ............. *B64D 27/02* (2013.01); *B64C 27/12* (2013.01); *B64D 33/00* (2013.01); *F01D 15/10* (2013.01);
(Continued)

(58) Field of Classification Search
None
See application file for complete search history.

(56) References Cited

U.S. PATENT DOCUMENTS

| | | | |
|---|---|---|---|
| 4,724,331 A | 2/1988 | Nordlund | |
| 5,864,221 A * | 1/1999 | Downs | H02J 1/108 320/134 |

(Continued)

FOREIGN PATENT DOCUMENTS

| | | |
|---|---|---|
| EP | 0 234 055 A2 | 9/1987 |
| EP | 2 581 586 A2 | 4/2013 |

(Continued)

OTHER PUBLICATIONS

International Search Report dated Feb. 18, 2016 in PCT/FR2015/052770 filed Oct. 15, 2015.

*Primary Examiner* — Steven M Sutherland
*Assistant Examiner* — Rodolphe Andre Chabreyrie
(74) *Attorney, Agent, or Firm* — Oblon, McClelland, Maier & Neustadt, L.L.P.

(57) ABSTRACT

The hybrid propulsion system for a multi-engine aircraft includes a plurality of free-turbine engines, each having a gas generator, among which at least a first engine, or hybrid engine, is suitable for operating in at least one standby mode during stabilized flight of the aircraft, while other engines of the plurality of engines operate alone during such stabilized flight. The hybrid engine is associated with first and second identical electric powertrains, each including a respective electrical machine capable of operating as a starter and as a generator, itself connected to a respective electronic power module, itself selectively connected to a specific electrical power supply network, such as an onboard network, and to a respective at least one electrical energy storage member. Each of the electric powertrains is adapted to deliver maximum power not less than half the total power needed for rapid reactivation of the hybrid engine.

12 Claims, 3 Drawing Sheets

(51) Int. Cl.
*F01D 15/10* (2006.01)
*F02C 7/268* (2006.01)
*B64C 27/12* (2006.01)
*F02C 9/42* (2006.01)
*B64D 33/00* (2006.01)

(52) U.S. Cl.
CPC ................ *F02C 7/268* (2013.01); *F02C 9/42* (2013.01); *B64D 2027/026* (2013.01); *F05D 2220/329* (2013.01); *F05D 2220/76* (2013.01); *Y02T 50/64* (2013.01)

(56) References Cited

U.S. PATENT DOCUMENTS

| | | |
|---|---|---|
| 2012/0025032 A1 | 2/2012 | Hopdjanian et al. |
| 2013/0086919 A1* | 4/2013 | Dooley ............... F02C 7/26 60/778 |
| 2013/0147204 A1* | 6/2013 | Botti .................. B64D 27/24 290/1 A |
| 2013/0219905 A1 | 8/2013 | Marconi et al. |
| 2013/0233977 A1 | 9/2013 | Smiley et al. |
| 2014/0013751 A1* | 1/2014 | Roggemans ........... B64D 31/14 60/705 |
| 2014/0117148 A1 | 5/2014 | Dyrla et al. |
| 2014/0283519 A1 | 9/2014 | Mariotto et al. |
| 2015/0143950 A1 | 5/2015 | Bedrine et al. |
| 2015/0322864 A1 | 11/2015 | Dooley et al. |

FOREIGN PATENT DOCUMENTS

| | | |
|---|---|---|
| EP | 2 636 596 A2 | 9/2013 |
| FR | 2 962 404 A1 | 1/2012 |
| FR | 2 967 133 A1 | 5/2012 |
| FR | 2 992 630 A1 | 1/2014 |
| FR | 2 993 243 A1 | 1/2014 |
| FR | 2 997 382 A1 | 5/2014 |
| FR | 3 003 514 A1 | 9/2014 |

* cited by examiner

HYBRID PROPULSION SYSTEM FOR A MULTI-ENGINE AIRCRAFT

TECHNICAL FIELD

The invention lies in the field of free turbine engines, as are commonly to be found on helicopters.

It should be recalled that a free-turbine engine (sometimes referred to as a gas turbine (GT)) comprises a power turbine or "free" turbine that, in a helicopter, drives its rotors via an overrunning clutch (freewheel) and a main gearbox (MGB), together with a gas generator constituted mainly by a compressor, a combustion chamber, and a high pressure turbine.

Stepdown gearing of an "accessory gearbox" serves to connect the shaft of the gas generator to an electrical machine (ELM) constituted by a stator and a rotor and capable of operating equally well as a motor (starter) or as a generator. In motor mode, the electrical machine is powered by a source of electrical energy, and it develops torque for driving the gas generator of the turbine engine in rotation, in particular for the purposes of starting it and of putting it in a standby mode, thus providing assistance to the gas generator. In generator mode, the electrical machine is driven in rotation by the gas generator so as to take off mechanical power therefrom, which power is then converted into electrical power for powering a direct current (DC) low voltage onboard network (OBN) of the aircraft in flight. The OBN is generally connected to a low voltage electricity storage device, e.g. a 28 volt (V) storage battery.

The invention relates more particularly to a hybrid propulsion system for a multi-engine aircraft, in particular a twin-engine or three-engine aircraft, i.e. a system having at least one engine that can be put on standby during a stage of flight referred to as an "economic stage of flight", while one or more other engines are kept active.

STATE OF THE ART

When an aircraft having two turbine engines is in a cruising flight situation, Documents FR 2 967 132 and FR 2 967 133 propose putting one of the two engines into a standby mode so as to desynchronize its free turbine from the MGB while simultaneously increasing the power from the other engine, thereby making it possible to reduce the overall fuel consumption of the system.

That invention thus lies in particular in the context of reducing the consumption of a helicopter having at least two engines, in which, during economic cruising flight, i.e. in a stage of flight characterized by a relatively low power command on each engine thus giving rise to very high specific consumption (SC), one of the engines is put on standby so that the other engine operates at high power and as a result benefits from much lower specific consumption.

Several variants of that standby mode have been proposed.

In a standby mode referred to as "ordinary idle", the combustion chamber is alight and the shaft of the gas generator is rotating at a speed lying in the range 60% to 80% of its nominal speed.

In a first variant, referred to as "super-idle", the gas generator of the desynchronized gas generator can be regulated on an idle mode at low speed in which the shaft of the gas generator rotates at a speed lying in the range 20% to 60% of its nominal speed.

In a second variant, referred to as "assisted super-idle", the gas generator of the gas turbine that is desynchronized from the MGB may also be regulated on a an idle mode that is slow, with assistance drive torque then being applied to the gas generator by means of the electrical machine and the accessory gearbox.

In a third variant, the combustion chamber of the turbine engine may be completely shut down, and it is then proposed to maintain the gas generator in rotation at a speed suitable for facilitating re-lighting at the end of the stage of cruising flight. The appropriate range of speeds may be referred to as a preferred ignition window. This mode of operation, referred to as "turning" mode involves providing prolonged assistance to the gas generator. The shaft of the gas generator, with mechanical assistance, rotates at a speed lying in the range 5% to 20% of its nominal speed.

In these modes of operation, which are likely to be maintained throughout the duration of cruising flight, the power transmitted to the MGB by the engine on standby is generally zero, and as a general rule it is not possible to take power from its gas generator.

In the above-mentioned variants, it is necessary to be capable of reactivating the desynchronized engine quickly, in particular in an emergency situation, e.g. in the event of another engine failing, if there are three or more engines in all, or in the event of the other engine failing if there are two engines. In particular, that is why the gas generator is maintained in rotation at a speed suitable for facilitating re-lighting in the system where the combustion chamber is shut down.

Maintaining the gas generator in rotation in the preferred ignition window ("turning" mode) and providing prolonged assistance to the gas generator regulated to idle ("assisted super-idle" mode) require relatively little power, with the advantage of the system lying in it being used over a long duration of flight.

Proposals are made in Documents FR 2 967 132 and FR 2 967 133, among other solutions, to make use of an electric starter powered by a starter/generator connected to the gas generator of the other engine, or of a generator driven directly or indirectly by the free turbine of the other engine.

For an emergency restart beginning from a low speed situation in which the combustion chamber is shut down, it is necessary to apply high power to the shaft of the gas generator because of the large inertia of the rotating assemblies and because of the opposing torque from the compressor of the engine. This power needs to be delivered for a duration that is short, of the order of a few seconds, in order to guarantee that the engine starts quickly.

In Document FR 2 967 133, it is suggested, among other solutions, to make use of a source of electrical energy, in particular a supercapacitor, in order to power an electrical machine that supplies a burst of assistance to the gas generator.

In Document EP 2 581 586, proposals are also made to use two supercapacitors (which are electricity storage members), each of which is charged respectively by an electricity generator driven by the gas generator of one of the two engines, and each of which serves to provide a burst of power for starting the other engine when it is a shut-down state.

In this context, the present invention has in particular the object of providing practical technical means for performing the "rapid reactivation" function on board an aircraft having at least two engines beginning from an economic mode of the turbine, by using, instead of the conventional electric starter, an electrical power system powered either by the onboard network or else by a specific electrical power network and making it possible to perform the following different modes of operation:

starting the gas turbine engine on the ground;

economic mode, in which one engine is in standby mode, which is a mode that is economical in terms of energy and in which mechanical power is not delivered to the rotor of the aircraft;

normal reactivation in flight of the engine that was previously in economic mode, constituting reliable starting from standby mode, without significant time constraint; and rapid reactivation in flight of the engine that was previously in economic mode, which constitutes emergency starting, making it possible in a minimum length of time to bring the engine up to power from standby mode, i.e. to take the engine quickly from standby mode in order to reach "nominal" power in which the engine supplies mechanical power to the main gearbox.

Leaving standby mode in an emergency involves lighting the combustion chamber and driving the shaft of the gas generator up to a speed lying in the range 80% to 105% in a period of time that is shorter than 10 seconds (s) after issuing the command to leave standby mode.

Leaving standby normally involves lighting the combustion chamber and driving the shaft of the gas generator up to a speed lying in the range 80% to 105% in a period of time lying in the range 10 s to 1 minute (min) after issuing the command to leave standby mode.

A turbine engine suitable for operating in a standby mode is referred to as a hybrid turbine engine.

Hybridizing propulsion systems makes it possible to increase their efficiency. In contrast, the weight of present electrical power components makes them difficult to use for applications on board an aircraft.

It is therefore necessary to devise and develop an architecture that is pared-down to the minimum in order to propose a propulsion system that is capable of flying in economic cruising mode, in which the power needed for flight is delivered by a minimum number of engines, while the others are in standby mode, while nevertheless enabling an engine to exit standby mode efficiently whether by normal reactivation or by rapid reactivation.

For questions of reliability, it is also necessary to be able to carry out regular testing of the reactivation system and to satisfy all operating safety requirements and certification requirements for propulsion systems.

The architectures for hybrid aircraft propulsion systems that have been proposed in the past are complex and involve large amounts of onboard weight, or they do not make it possible to carry out tests on equipment for providing rapid reactivation, or they do not satisfy the necessary reliability and availability requirements.

SUMMARY OF THE INVENTION

In order to remedy the above-mentioned drawbacks, in accordance with the invention, there is provided a hybrid propulsion system for a multi-engine aircraft, the system comprising a plurality of free-turbine engines each having a gas generator, and including at least one first engine, referred to as a "hybrid" engine, that is suitable for operating in at least one standby mode during stabilized flight of the aircraft, while other engines of said plurality of engines operate alone during such stabilized flight, the hybrid engine being associated with at least one first electric powertrain comprising a first electrical machine capable of operating as a starter and as a generator, itself connected to a first electronic power module, itself selectively connected to a specific electrical power supply network, such as an onboard network, and to at least one first electrical energy storage member, said hybrid engine also being associated with a second electric powertrain identical to said first electric powertrain and comprising a second electrical machine capable of operating as a starter and as a generator, itself connected to a second electronic power module, itself selectively connected to said specific electrical power supply network and to at least one second electrical energy storage member, the system being characterized in that each of the first and second electric powertrains is adapted to deliver a maximum power not less than half the total power (Prr) needed for rapid reactivation of said hybrid engine and in that each of the first and second electric powertrains is adapted to be capable of delivering to the hybrid engine in selective manner either normal reactivation power or starting power (Pdem), or else a standby power (Pv), or else half standby power (Pv/2), or else half rapid reactivation power (Prr/2).

Preferably, the normal reactivation power or starting power is of the order of 20% of the total rapid reactivation power (Prr).

Preferably, the standby power is of the order of 3% to 5% of the total rapid reactivation power (Prr).

In an aspect of the invention, each of the first and second electronic power modules is adapted to be capable of receiving power respectively from the first or the second electrical energy storage member in order to power respectively in isolated manner and in alternation with the other of said first and second electronic power modules, each of the first and second electrical machines with normal reactivation power or starting power (Pdem).

In another aspect of the invention, each of the first and second electronic power modules is adapted to be capable of receiving power respectively from the first or the second electrical energy storage member for powering respectively and simultaneously with the other of said first and second electronic power modules, each of the first and second electrical machines with half rapid reactivation power (Prr/2).

In yet another aspect of the invention, each of the first and second electronic power modules is adapted to be capable of receiving power from said specific electrical power supply network in order to power respectively and simultaneously with the other of said first and second electronic power modules the first and second electrical machines either with half normal reactivation power or half starting power (Pdem/2), or else with half standby power (Pv/2).

In a variant, each of the first and second electronic power modules is adapted to be capable of receiving power respectively from the first or the second electrical energy storage member in order to power respectively and simultaneously with the other of said first and second electronic power modules, the first and the second electrical machines either with half normal reactivation power or starting power (Pdem/2), or else with half standby power (Pv/2).

In yet another aspect of the invention, each of the first and second electronic power modules is adapted to be capable of receiving power from said specific electrical power supply network in order to power respectively in isolated manner and in alternation with the other of said first and second electronic power modules the first and second electrical machines either with normal reactivation power or starting power (Pdem), or else with standby power (Pv).

In yet another aspect of the invention, each of the first and second electronic power modules is adapted to be capable of receiving power from said specific electrical power supply network or respectively from the first or the second electrical energy storage member in order to power respectively in isolated manner and in alternation with the other of said first and second electronic power modules, or in simultaneous manner, the first and second electrical machines with variable power (Pvar) less than or equal to half the total power (Prr) needed for rapid reactivation of said hybrid engine, in order to be able to carry out power tests periodically.

In a particular embodiment, the first and second electrical energy storage members comprise two storage members that are physically dissociated.

In another possible embodiment, the first and second electrical energy storage members comprise two storage members that are distinct but physically grouped together.

The invention also provides a multi-engine aircraft including a hybrid propulsion system as mentioned above.

The aircraft may be a helicopter.

BRIEF DESCRIPTION OF THE FIGURES

Other characteristics and advantages of the invention appear from the detailed description of particular embodiments of the invention given with reference to the accompanying drawings, in which.

DETAILED DESCRIPTION

The hybrid propulsion system for a multi-engine aircraft of the invention comprises a plurality of free-turbine engines each equipped with a gas generator, among which engines at least a first engine, or hybrid engine, is suitable for operating in at least one standby mode during stabilized flight of the aircraft, while other engines of the plurality of engines are operating alone during the stabilized flight.

FIGS. 1 to 9 show the hybrid turbine engine 1 on its own together with the controlling electric powertrains of this hybrid engine, while the other engines in use may be conventional. Nevertheless, it is also possible on a single aircraft to make use of a plurality of hybrid engines analogous to the hybrid engine 1 described with reference to the accompanying drawings. The invention can thus apply to all of the engines of an aircraft of multi-engine architecture.

Figure 1:
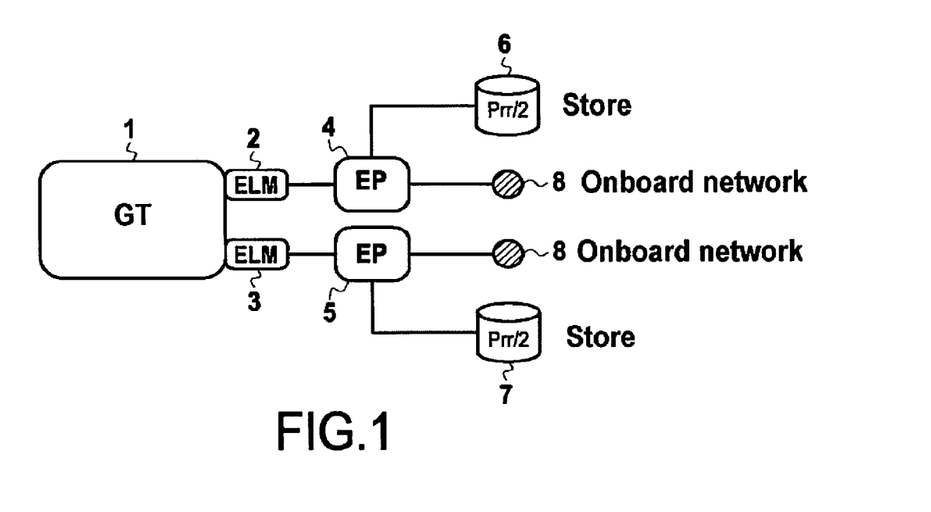
FIG. 1 is a diagram of a hybrid architecture of a propulsion system for a turbine engine having two controlling electric powertrains in a first embodiment of the invention.

With reference to FIG. 1, it can be seen that the hybrid engine 1 is associated with first and second identical electric powertrains, each comprising a respective electrical machine 2, 3 capable of operating as a starter and as a generator, which machine is itself connected to a respective electronic power module 4, 5, itself selectively connected to a specific electrical power supply network 8, such as an onboard network, and to at least one electrical energy storage member, respectively 6, 7.

Each of the electric powertrains is adapted to deliver a maximum power that is not less than half the total power Prr needed for rapid reactivation of the hybrid engine 1.

FIG. 1 shows the first and second electrical energy storage members 6, 7, which comprise two storage members that are physically dissociated, each of which is capable of delivering at least half of the power and of the total energy needed for rapid reactivation of the engine 1, or each of which is capable of delivering the power necessary for normal reactivation of the engine 1.

Figure 2:
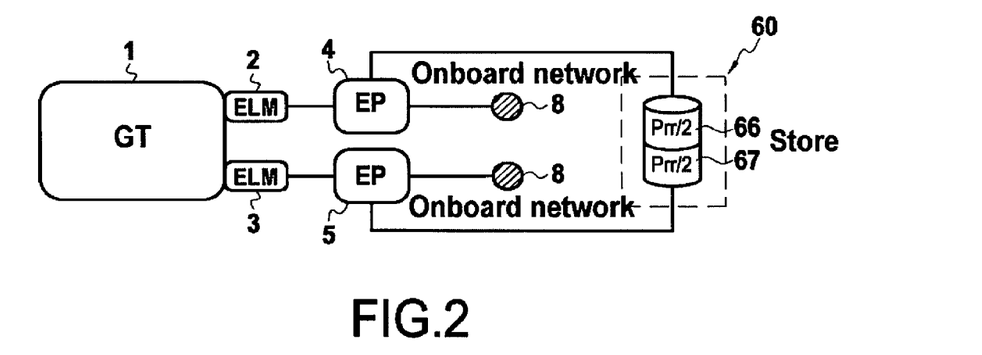
FIG. 2 is a diagram of a hybrid architecture of a propulsion system for a turbine engine having two controlling electric powertrains in a second embodiment of the invention.

Nevertheless, as shown in FIG. 2, the first and second electrical energy storage members may comprise two distinct storage members 66, 67 that are isolated from each other, but that are physically grouped together in a single physical entity 60, with each storage member constituting half of this entity.

The storage members 6, 7 or 66, 67, also referred to for short as "stores", may be electrochemical or electrostatic in nature.

Each of the first and second electric powertrains is adapted to be capable of delivering selectively to the hybrid engine 1 either normal reactivation power or starting power Pdem, or else standby power Pv, or else half-standby power Pv/2, or else half-rapid reactivation power Prr/2.

Normal reactivation power or starting power is generally about 20% of the total rapid reactivation power Prr.

Standby power is generally about 3% to 5% of the total rapid reactivation power Prr.

Each dedicated electronic power module 4, 5 is capable of powering the corresponding electrical machine 2, 3 for a limited time with at least half of the power needed for rapid reactivation, i.e. Prr/2, or with the power needed for normal reactivation Pdem (which also corresponds to starting power).

Each dedicated electronic power module 4; 5 is itself supplied with energy either by the corresponding store 6, 66; 7, 67, or by the onboard network 8 of the aircraft, or by both together. It should be observed that the power available from the onboard network 8 is, a priori, limited since the onboard network 8 also needs to supply the electrical power needed for all of the onboard systems.

Each dedicated electronic power module 4, 5 is also capable of continuously powering the corresponding electrical machine 2, 3 for its use in the standby mode of the engine 1, and it is also adapted to control the corresponding electrical machine 2, 3 for the reliable starting procedure or for the normal reactivation procedure.

Each of the electrical machines 2, 3 is adapted to deliver at least half of the power needed for rapid reactivation, and the power needed for normal reactivation.

Furthermore, each electrical machine 2, 3 that drives the gas generator of a hybrid engine 1 is capable of maintaining that engine continuously in standby mode, of starting the engine 1, and of performing normal reactivation.

The engine 1 has an accessory gearbox suitable for receiving both electrical machines 2, 3, in addition to the standard equipment needed for proper operation of the engine 1.

With reference to FIGS. 3 to 9 there follows a description of the various modes of operation of the architecture of the invention. In these figures, elements of the architecture that are not active are drawn in dashed lines, while elements of the architecture that are active are drawn in normal manner with continuous lines.

Figure 3:
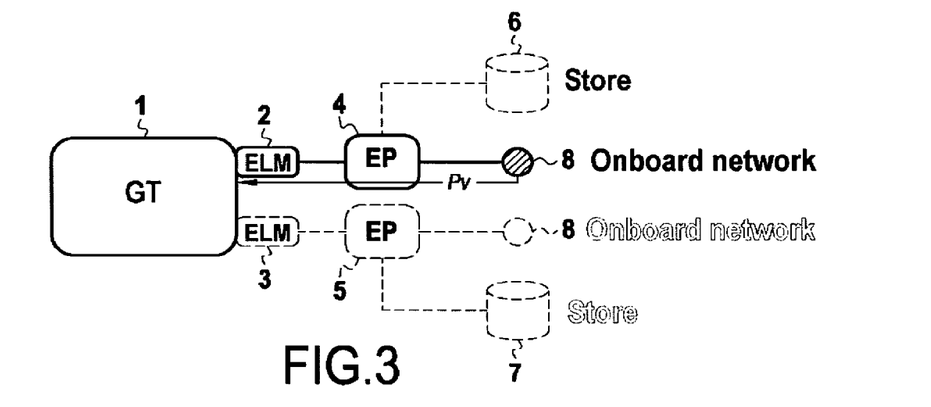
FIG. 3 is a diagram showing the operation of the FIG. 1 hybrid architecture in standby mode with a single active controlling electric powertrain.
Figure 4:
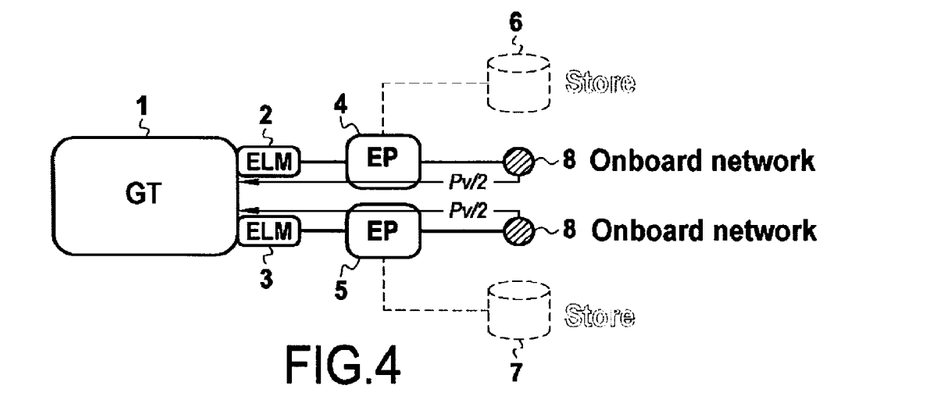
FIG. 4 is a diagram showing the operation of the FIG. 1 hybrid architecture in standby mode with two active controlling electric powertrain.

FIGS. 3 and 4 show how the standby mode of the engine 1 can be implemented with the two electric powertrains in two different embodiments, in which energy is always taken from the onboard network 8.

As shown in FIG. 3, the power Pv needed for standby mode, which represents about 3% to 5% of the total available power Prr, can be delivered in alternation by the two electric powertrains on different missions.

FIG. 3 shows the electric powertrain including the first electrical machine 2 and the first electronic power module 4 powered by the onboard network 8 as being active while the second electrical machine 3, the second electronic power module 5, and the stores 6 and 7 are not involved. In a subsequent mission of the aircraft, the roles should be interchanged so that it is the second electrical machine 3 and the second electronic power module 5 powered by the onboard network 8 that are active, while the first electrical machine 2, the first electronic power module 4, and the stores 6 and 7 are not involved.

FIG. 4 shows an embodiment in which, in standby mode of the engine 1, both electric powertrains are active simultaneously, but each delivers a power of only Pv/2 equal to half the power Pv needed for standby mode, i.e. of the order of 1% to 3% of the total power Prr. The first and second electrical machines 2 and 3 and the first and second electronic power modules 4 and 5 are thus active simultaneously, both drawing power from the onboard network 8, while the stores 6 and 7 are not involved.

Figure 5:
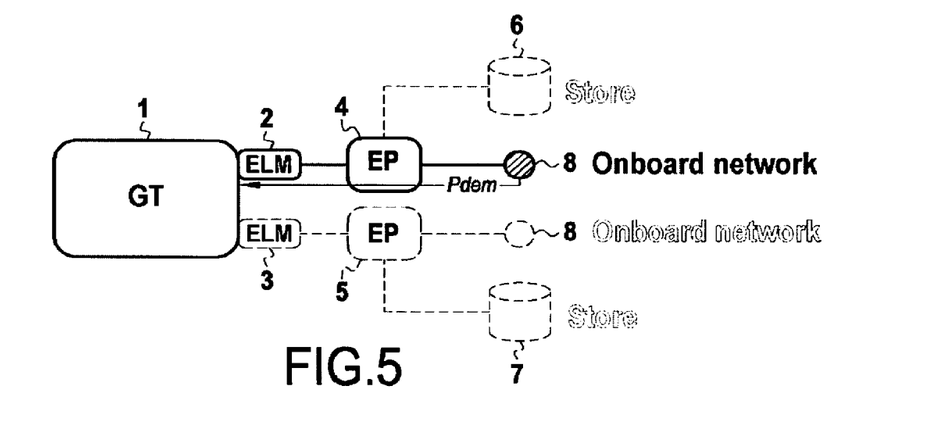
FIG. 5 is a diagram showing the operation of the FIG. 1 hybrid architecture in normal reactivation or starting mode with a single active controlling electric powertrain powered by an onboard network.
Figure 6:
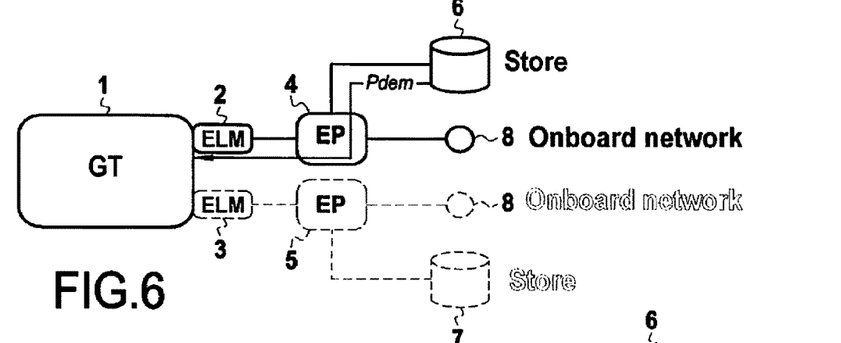
FIG. 6 is a diagram showing the operation of the FIG. 1 hybrid architecture in a normal reactivation or starting mode with a single active controlling electric powertrain powered by an electrical energy storage member.
Figure 7:
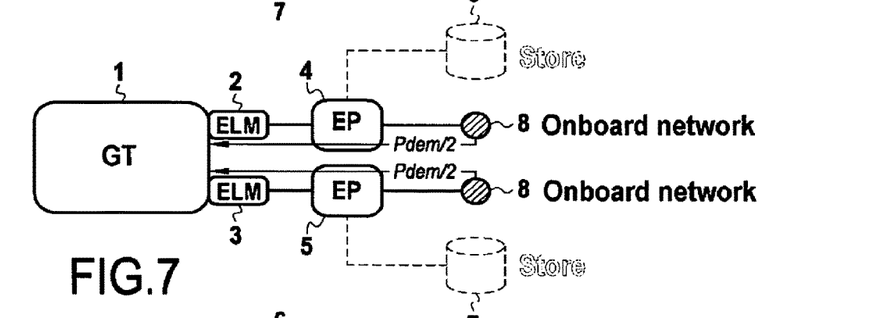
FIG. 7 is a diagram showing the operation of the FIG. 1 hybrid architecture in normal reactivation or starting mode with two active controlling electric powertrains powered by the onboard network.

FIGS. 5 to 7 show how the normal reactivation mode or starting mode of the engine 1 can be performed by the two electric powertrains in three different embodiments.

In the first embodiment shown in FIG. 5, the energy corresponding to normal reactivation or mechanical power Pdem, which is typically of the order of 20% of the total power Prr needed for rapid reactivation, is taken from the onboard network 8 and only one electric powertrain is used.

FIG. 5 shows the electric powertrain comprising the first electrical machine 2 and the first electronic power module 4 powered by the onboard network 8 as being active, while the second electrical machine 3, the second electronic power module 5, and the stores 6 and 7 are not involved. In a following mission of the aircraft, the roles should be interchanged so that it is the second electrical machine 3 and the second electronic power module 5 powered by the onboard network 8 that are active, while the first electrical machine 2, the first electronic power module 4, and the stores 6 and 7 are not involved.

The embodiment of FIG. 6 is analogous to the embodiment of FIG. 5 insofar as only one electric powertrain is used, however the energy corresponding to normal reactivation or mechanical power Pdem, which is typically of the order of 20% of the total power Prr needed for rapid reactivation, is taken not from the onboard network 8, but from a store.

In FIG. 6, the electric powertrain comprising the first electrical machine 2 and the first electronic power module 4 powered by the store 6 is shown as being active, while the second electrical machine 3, the second electronic power module 5, the store 7, and the onboard network 8 are not involved in this operation. In a following mission of the aircraft, the roles should be interchanged so that it is the second electrical machine 3 and the second electronic power module 5 powered by the store 7 that are active, while the first electrical machine 2, the first electronic power module 4, the store 6, and the onboard network 8 are not involved.

Naturally, when the embodiment of FIG. 2 is used, the store 66 and the store 67 perform the same roles as the stores 6 and 7, respectively.

FIG. 7 shows an embodiment in which, in normal reactivation or starting mode of the engine 1, both electric powertrains are active simultaneously, but with each delivering power of only Pdem/2 equal to half of the power Pdem needed for standby mode, i.e. typically of the order of 20% of the total power Prr. The first and second electrical machines 2 and 3 and the first and second electronic power modules 4 and 5 are thus active simultaneously.

FIG. 7 shows connections indicating that energy is taken by the first and second electronic power modules 4 and 5 from the onboard network 8, while the stores 6 and 7 are not involved.

Nevertheless, in a variant, in the embodiment of FIG. 7, where both electric powertrains are active simultaneously, the first and second electronic power modules 4 and 5 could take energy corresponding to Pdem/2 from the stores 6 and 7 respectively (or 66 and 67 if the embodiment of FIG. 2 is being used) and not from the onboard network 8.

Figure 8:
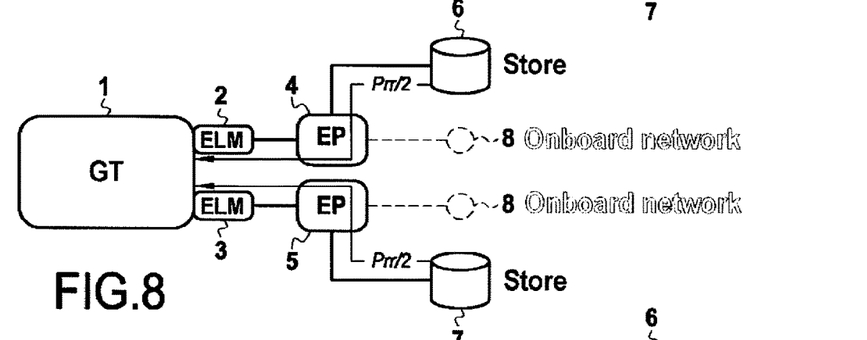
FIG. 8 is a diagram showing the operation of the FIG. 1 hybrid architecture in rapid reactivation mode with two active controlling electric powertrains powered by electrical energy storage members.

FIG. 8 shows an embodiment in which, in rapid reactivation mode of the engine 1, both electric powertrains are active simultaneously in simultaneous and coordinated operation, but each delivers power of only Prr/2 equal to half the total power Prr needed for rapid reactivation mode. The first and second electrical machines 2 and 3 and the first and second electronic power modules 4 and 5 are thus active simultaneously.

In the embodiment of FIG. 8, energy is taken by the first and second electronic power modules 4 and 5 firstly from the stores 6 and 7 (or 66 and 67 for the embodiment of FIG. 2), in equal shares for power of the order of Prr/2. Nevertheless, additional power, where necessary, may be taken by the first and second electronic power modules 4 and 5 from the onboard network 8.

Figure 9:
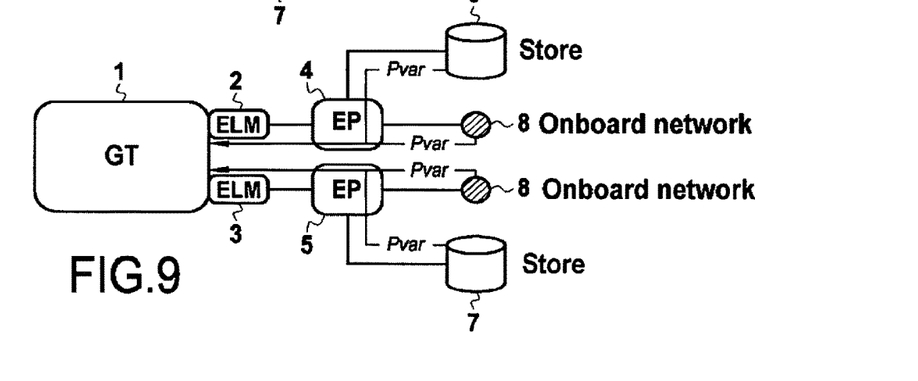
FIG. 9 is a diagram showing the operation of the FIG. 1 hybrid architecture in a mode for carrying out variable power tests with two active controlling electric powertrains powered by the onboard network and by electrical energy storage members.

FIG. 9 shows a configuration of the architecture of FIG. 1 in which a test is carried out by applying varying power Pvar, where Pvar can vary between almost zero power and power equal to half of the total power Prr, for each of the complete electric powertrains in order to guarantee proper operation and performance for the system.

The test is preferably carried out each time the propulsion system of the aircraft is started on the ground, but it can also be carried out in flight, should that be necessary.

The energy needed for testing proper operation may be supplied by the onboard network 8 or by the energy storage members 6, 7 or 66, 67, as required.

The tests may be performed in alternation or simultaneously on both electric powertrains.

By way of example, FIG. 9 shows the situation in which all of the branches of all of the electric powertrains are tested simultaneously with variable power Pvar that is thus delivered by the stores 6 and 7 and by the onboard network 8 to each of the electronic power modules 4 and 5.

The present invention provides various advantages over existing solutions, and in particular it makes it following possible:

- a spot reactivation test on every other mission for each electric powertrain by means of the starting procedure before each mission and alternating the use of the electric powertrains;
- a permanent test of the operation of the electric powertrain by means of the standby mode, which makes use of the electric powertrain(s) and which causes the electrical machines to rotate permanently while economic mode is in use;
- segregation between the electric powertrains is provided in particular for the energy storage portion by making use of two identical stores 6 and 7 that are physically dissociated and each suitable for storing half of the maximum required energy (Prr/2), or by using a single store 60 grouping together two identical stores 66 and 67 each suitable for storing half of the maximum required energy (Prr/2), these two identical stores 66 and 67 being in a single physical unit but being isolated from each other;
- redundancy for normal reactivation mode by having two independent electric powertrains;
- redundancy for the power supplies insofar as normal reactivation can be obtained either from a store 6, 7 or 66, 67 or from the onboard network 8, depending on the availability of these sources; and
- minimized and optimized dimensioning of the two electric powertrains that enable power from both electric powertrains to be added together in order to obtain the power needed for rapid reactivation (see FIG. 8).

In general, the invention is not limited to the embodiments described, but extends to any variant within the ambit of the scope of the accompanying claims.

The invention claimed is:

1. A hybrid propulsion system for a multi-engine aircraft, the system comprising:
   a plurality of free-turbine engines each having a gas generator, the plurality of free-turbine engines including a first hybrid engine operable in a standby mode during a stabilized flight of the multi-engine aircraft, while other engines of said plurality of free-turbine engines operate alone during the stabilized flight, the hybrid engine being electrically connected to a first electric powertrain and a second electric powertrain identical to and distinct from the first electric powertrain,
   the first electric powertrain comprising
      a first electrical machine operable as a starter and as a generator,
      a first electronic power module connected to the first electrical machine,
      a specific electrical power supply network, and
      a first electrical energy storage member,
   the second electric powertrain comprising
      a second electrical machine operable as a starter and as a generator,
      a second electronic power module connected to the second electrical machine, and
      a second electrical energy storage member,
   wherein the first electric power module is configured to
      selectively connect to the specific electrical power supply network to provide a standby power, a half standby power, a normal reactivation power, and a half normal reactivation power, to the first electrical machine, and
      selectively connect to the first electrical energy storage to provide a half rapid reactivation power and the normal reactivation power, to the first electrical machine, wherein the second electric power module is configured to
      selectively connect to the specific electrical power supply network to provide the standby power, the half standby power, the normal reactivation power, and the half normal reactivation power, to the second electrical machine, and
      selectively connect to the second electrical energy storage to provide the half rapid reactivation power and the normal reactivation power, to the second electrical machine, and
   wherein the normal reactivation power is less than the rapid reactivation power, and the standby power is less than the normal reactivation power.

2. The hybrid propulsion system according to claim 1, wherein said normal reactivation power or is 20% of the rapid reactivation power.

3. The hybrid propulsion system according to claim 1, wherein said standby power is 3% to 5% of the rapid reactivation power.

4. The hybrid propulsion system according to claim 1, wherein each of the first and second electronic power modules is further configured to receive power respectively from the first and the second electrical energy storage members in order to power respectively in isolated manner and in alternation with the other of the first and the second electronic power modules, each of the first and the second electrical machines with the normal reactivation power.

5. The hybrid propulsion system according to claim 4, wherein each of the first and the second electronic power modules is further configured to receive power from the specific electrical power supply network or respectively from the first and the second electrical energy storage member in order to power respectively in isolated manner and in alternation with the other of the first and the second electronic power modules, or in simultaneous manner, the first and second electrical machines with a variable power being less than or equal to the half rapid reactivation power.

6. The hybrid propulsion system according to claim 1, wherein each of the first and the second electronic power modules is further configured to receive power respectively from the first and the second electrical energy storage member for powering respectively and simultaneously with the other of the first and the second electronic power modules, each of the first and the second electrical machines with the half rapid reactivation power.

7. The hybrid propulsion system according to claim 1, wherein each of the first and the second electronic power modules is further configured to receive power from the specific electrical power supply network in order to power respectively and simultaneously with the other of the first and the second electronic power modules the first and second electrical machines either with the half normal reactivation power, or with the half standby power.

8. The hybrid propulsion system according to claim 1, wherein each of the first and the second electronic power modules is further configured to receive power respectively from the first and the second electrical energy storage member in order to power respectively and simultaneously with the other of the first and the second electronic power modules the first and second electrical machines, either with the half normal reactivation power or with the half standby power.

9. The hybrid propulsion system according to claim 1, wherein each of the first and the second electronic power modules is further configured to receive power from the specific electrical power supply network in order to power respectively in isolated manner and in alternation with the other of the first and the second electronic power modules, the first and the second electrical machines either with the normal reactivation power or with the standby power.

10. The hybrid propulsion system according to claim 1, wherein the first and second electrical energy storage members comprise two storage members that are physically dissociated.

11. The hybrid propulsion system according to claim 1, wherein the first and second electrical energy storage members comprise two storage members that are distinct but physically grouped together.

12. A multi-engine aircraft comprising the hybrid propulsion system according to claim 1.

* * * * *